United States Patent [19]

Curley et al.

[11] Patent Number: 5,230,065
[45] Date of Patent: Jul. 20, 1993

[54] APPARATUS AND METHOD FOR A DATA PROCESSING SYSTEM HAVING A PEER RELATIONSHIP AMONG A PLURALITY OF CENTRAL PROCESSING UNITS

[75] Inventors: John L. Curley, North Andover; Thomas S. Hirsch, Bedford; John C. Penney, Chelmsford; Ileana S. Reisch, Carlisle; Theodore R. Staplin, Jr., Chelmsford; David A. Wurz, Winchester, all of Mass.

[73] Assignee: Bull HN Information Systems Inc., Billerica, Mass.

[21] Appl. No.: 544,058

[22] Filed: Jun. 25, 1990

Related U.S. Application Data

[63] Continuation of Ser. No. 136,055, Dec. 21, 1987, abandoned.

[51] Int. Cl.⁵ .................. G06F 15/16; G06F 13/00
[52] U.S. Cl. .................. 395/200; 364/DIG. 1; 364/280; 364/280.6; 364/228.3; 395/500; 395/700
[58] Field of Search ......... 395/200 MS, 700 MS, 395/600 MS, 500

[56] References Cited

U.S. PATENT DOCUMENTS

| | | | |
|---|---|---|---|
| 4,399,504 | 8/1983 | Obermarck et al. | 364/200 |
| 4,410,962 | 10/1983 | Daniels et al. | 364/900 |
| 4,443,846 | 4/1984 | Adcock | 364/200 |
| 4,449,181 | 5/1984 | Young et al. | 364/200 |
| 4,559,614 | 12/1985 | Peek et al. | 364/900 |
| 4,584,644 | 4/1986 | Lorner | 364/200 |
| 4,621,321 | 11/1986 | Boebert et al. | 364/200 |
| 4,648,061 | 3/1987 | Foster | 364/900 |
| 4,679,166 | 7/1987 | Berger et al. | 364/900 |
| 4,814,982 | 3/1989 | Weir | 364/200 |
| 4,843,541 | 6/1989 | Bean et al. | 364/200 |

FOREIGN PATENT DOCUMENTS

| | | |
|---|---|---|
| 0147574 | 11/1984 | European Pat. Off. |
| 0192944 | 1/1986 | European Pat. Off. |
| 0205943 | 5/1986 | European Pat. Off. |
| 2204432 | 11/1988 | United Kingdom |
| 8304117 | 5/1983 | World Int. Prop. O. |

OTHER PUBLICATIONS

N. Nagashima, Protocol Converter, Nov. 6, 1985, Patent Abstracts of Japan, vol. 9 No. 277 (E-355) (2000).
J. Paradise, CDP1800-Series Multiprocessing for Maximum Performance, IEEE Electro., vol. 7 (May, 1982) 1-11.

*Primary Examiner*—Kevin A. Kreiss
*Attorney, Agent, or Firm*—William W. Holloway; Faith F. Driscoll; John S. Solakian

[57] ABSTRACT

A data processing system is disclosed in which a plurality of central processing units have access to all the system resources, i.e., have a peer relationship. During initialization of the data processing system, all the system resources are allocated to the individual central processing units according to a preselected distribution procedure, the identification of available resources thereafter being stored in the files of the individual central processing units. During the operation of the data processing system, the resources can be reallocated by a predetermined procedure. The central processing units entering such a relationship are required to include apparatus and/or software procedures that prevent access to system resources not assigned thereto. A mail box procedure, using locations in the main memory unit permit communication between the central processing units and are used in the dynamic allocation of resources.

20 Claims, 5 Drawing Sheets

APPARATUS AND METHOD FOR A DATA PROCESSING SYSTEM HAVING A PEER RELATIONSHIP AMONG A PLURALITY OF CENTRAL PROCESSING UNITS

This is a continuation of copending application Ser. No. 07/136,066 on Dec. 21, 1987, now abandoned.

RELATED APPLICATIONS

The following U.S. Patent Applications are related applications to the present invention APPARATUS AND METHOD FOR ALTERABLE RESOURCE PARTITIONING ENFORCEMENT IN A DATA PROCESSING SYSTEM HAVING CENTRAL PROCESSING UNITS USING DIFFERENT OPERATING SYSTEMS; invented by John L. Curley, Thomas S. Hirsch, and David A. Wurz; having Ser. No. 07/136,056; filed on Dec. 21, 1987 and assigned to the assignee of the present U.S. patent application now U.S. Pat. No. 5,027,

BACKGROUND OF THE INVENTION

Field of the Invention

This invention relates generally to data processing systems and, more particularly, to data processing systems having a plurality of central processing units.

Description of the Related Art

Figure 1A:
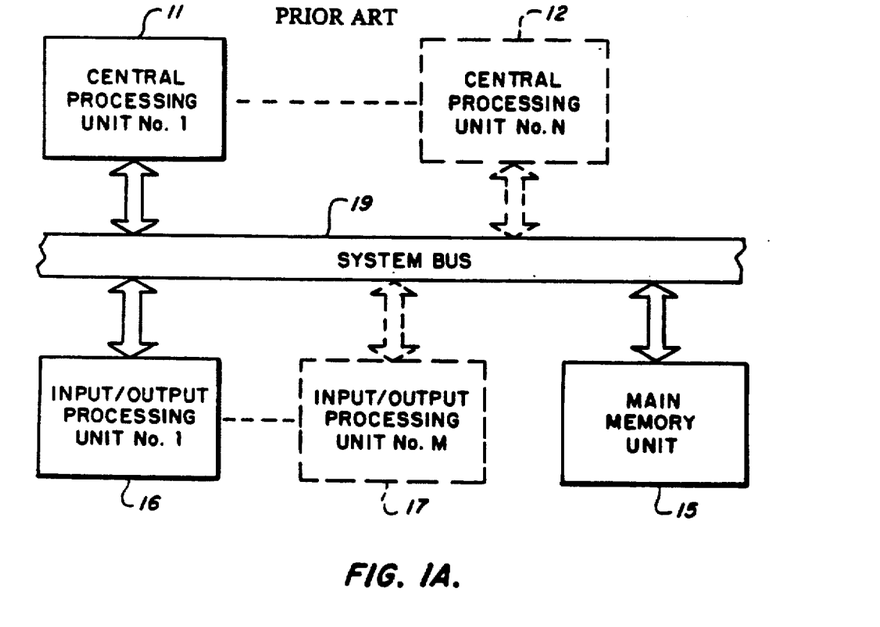

In order to increase the processing capability of data processing systems, one technique has been to couple additional central processing units to the system. The ability to select the number of central processing units in a data processing system permits an efficient matching of the capabilities of the system to the data processing requirements. Data processing units having a plurality of central processing units typically have one of two configurations. Referring now to FIG. 1A, a data processing system having a plurality of central processing units, according to a first implementation found in the prior art, is shown. The data processing system includes a plurality of central processing units 11-12 coupled to a system bus 19. The central processing units 11-12 perform the actual manipulation of data groups under control of operating and user software programs. The main memory unit 16, also coupled to the system bus 19, stores the data and program signal groups which are currently being used by the central processing units. The input/output units 14-15, coupled to the system bus 19, include devices for storage of large quantities of data and program signal groups, e.g., disk storage devices, terminals for the entry of data by system users, and communication devices for exchange of data and program groups with remote locations. The system bus 19 provides the principal path for the exchange of data and program groups between the components of the data processing system.

Figure 1B:
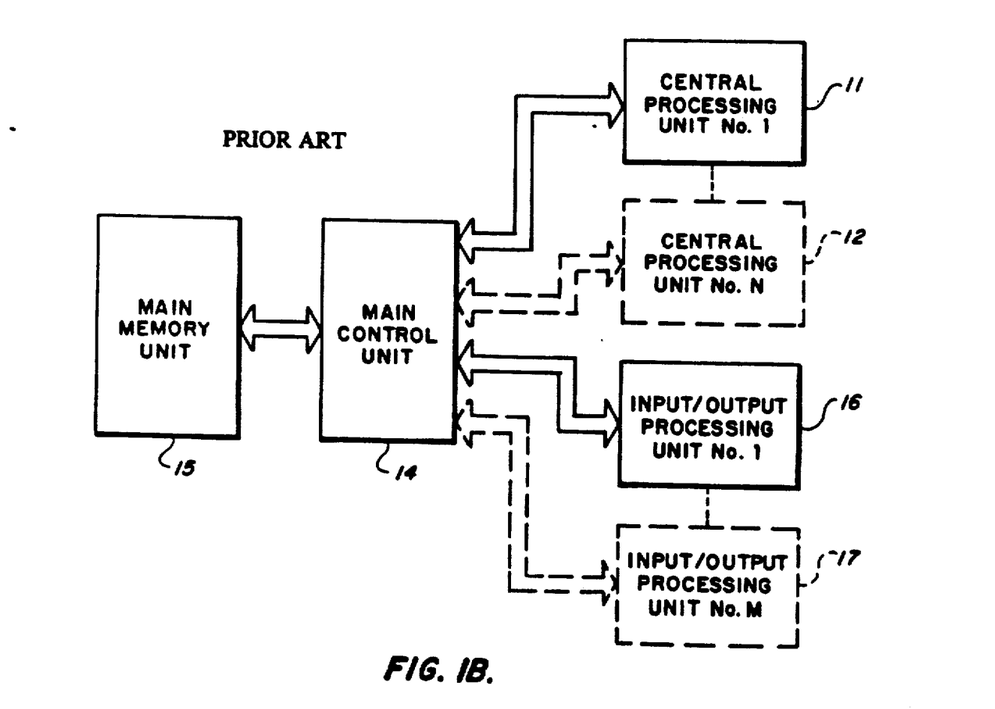
FIG. 1B is a block diagram of a memory controller oriented data processing system having a plurality of central processing units according to the prior art.

Referring next to FIG. 1B, a second implementation of a multiprocessor system, according to the related art, is shown. Generally, the same components are available to perform the processing functions as in FIG. 1A except that the components are coupled by a memory control unit 14 instead of by the system bus 19. The memory control unit 14 is typically an electronic switch providing the coupling of the data processing unit components in response to control signals. The memory control unit 14 can also provide functionality, such as conflict resolution, that would typically be distributed in the bus oriented data processing system.

The data processing systems of FIG. 1A and FIG. 1B are typically implemented in the related art such that the central processing units are homogeneous. In a homogeneous data processing system, the operating systems are the same or similar, the implementing apparatus is the same or similar and the operations performed on apparatus external to the data processing system is the same or similar. Even though the central processing units are homogeneous, substantial efforts are employed to prevent conflicts between the central processing units. For example, one of the central processing systems can be selected to allocate resources and tasks among the plurality of central processing units, thereby preventing conflicts for the resources by the plurality of programs that may be in current execution. The resources of the system are the storage devices, terminals, main memory locations and other data processing facilities to which a central processing unit has access for the purpose of performing the data processing functions. This relationship is generally referred to as the master/slave relationship because of the control asserted by the selected processor. However, some data processing systems can be designed wherein the central processing units, operating under control of the same operating system, can operate as equal members (as contrasted with the master/slave relationship) of the data processing system. The following references provide examples of the way in which a plurality of central processing units can be incorporated in a data processing system without the master/slave relationships while still resolving conflicts for system resources.

In U.S. Pat. No. 3,631,405, issued Dec. 28, 1971, entitled SHARING OF MICROPROGRAMS BETWEEN PROCESSORS and invented by G. S. Hoff and R. P. Kelly, two microprogrammed processing units share control elements that permit sharing of microprogram repertoires. By appropriate invocation of the operating system, the control signals from a first of the microprogrammed processing unit are transferred to the second microprogrammed processing unit. In fact, this configuration can best be described as a single processing unit with resources allocated by a supervisor controlled operating system. The use of a supervisor program as well as the coupling between the two processing units distinguishes this configuration from the peer processing unit relationship described in the present invention.

In U.S. Pat. No. 4,131,941, issued Dec. 26, 1978, entitled LINKED MICROPROGRAMMED PLURAL PROCESSOR UNIT and invented by H. L. Siegel, G. F. Muething, Jr., and E. J. Radkowski, a configuration of a plurality of processors is described that permits the processors to act independently or to be reconfigured so that a master/slave relationship can be invoked. The plurality of processors are linked together and, even when operating in a mode described as being independent, are not independent but subject to a supervisory control structure for configuration determination and for allocation of activity. Of course, the control of the allocation of activities implies the control of the allocation of resources. In addition, the data processing system described by this U.S. Patent, either has one operating system or a plurality of identical operating systems. The invention of the U.S. Patent appears to be best described as a single data processing system with a controllable configuration. The present invention is directed to data processing units that operate independently with different operating systems.

In U.S. Pat. No. 4,200,930, issued on Apr. 29, 1980, entitled ADAPTER CLUSTER MODULE FOR DATA COMMUNICATIONS SUBSYSTEM invented by R. L. Rawlings and R. D. Mathews, a host processing unit can have a plurality data communications subsystems coupled thereto for performing routine communications functions with incoming and outgoing signals. Although the data communications subsystems are capable, in case of a failure of the host processing unit, of continuing communications, the role of the host processing unit to the data communications subsystems is clearly that of a master/slave relationship. The peer processor relationship is not applicable because the data communications subsystems do not have access to all the resources available to the host processing unit.

In U.S. Pat. No. 4,722,048, issued on Jan. 26, 1988, entitled MICROCOMPUTER SYSTEM WITH INDEPENDENT OPERATING SYSTEMS, invented by T. S. Hirsch, J. W. Stonier and T. O. Holtey, two processors, an LSI-6 processor with a MOD400 operating system and an Intel 8086 processor with either and MS-DOS or a CPM-86 operating share the processing responsibilities (a Motorola 6809 microprocessor is also included, but generally functions as an input/output controller). The LSI-6 processor has memory space that is not accessible to the Intel 8086 processor. In addition, the input/output operations performed by the 6809 microprocessor can be initiated only by the LSI-6 processor, so that the Intel 8086 has access to this resource only through the intervention of the LSI-6 processor, a form of the master/slave relationship.

In U.S. patent application Ser. No. 06/859,593, filed on May 5 now U.S. Pat. No. 4,862,354 entitled MULTI-PROCESSOR SYSTEM ARCHITECTURE, invented by C. Fiacconi et. al., the communication of two processors is described. In this application, the sharing of memory without interference is accomplished by controlling buses associated with each processor system. The buses are coupled to particular areas of memory and for one processor to access the memory dedicated to the second processor, the bus of the first processor is coupled to the bus of the second processor. Apparatus associated with each bus controls the ability of the other processor to access the bus, thereby effectively limiting access of each processor to the system resources.

More recently, interest has been demonstrated in data processing systems incorporating a plurality of central processing units, the central processing generally having non-homogeneous (generally incompatible) characteristics. The availability of non-homogeneous central processing units can be particularly advantageous to a system user providing the availability of a plurality of program repertoires. Ideally, all of the central processing units should have a peer relationship, i.e., should be capable of accessing all the data processing system resources without the benefit of auxiliary protection mechanisms described in relation to the related art and without having a master/slave relationship in which one central processing unit controls all the activity and allocation of resources. Many central processing systems do not have the necessary hardware and/or software functionality to enforce allocation of resources. Non-the-less, the peer relationship between central processing units is a desirable multiprocessor relationship, allowing easy expandability of the processing system.

A need has therefore been felt for technique that permits a plurality of (normally) incompatible central processing units to be coupled in a data processing system and to operate without conflict without requiring that a hierarchical relationship exist among the central processing units.

SUMMARY OF THE INVENTION

It is an object of the present invention to provide an improved data processing system that overcomes the disadvantages of the prior art.

It is a feature of the present invention to provide an improved data processing system having a plurality of central processing units.

It is another feature of the present invention to provide an improved data processing system having a plurality of central processing units utilizing different operating systems.

It is a further feature of the present invention to provide an improved data processing system in which a plurality of central processing units execute instructions under different operating systems, the central processing units having a peer relationship.

It is more particular feature of the present invention to provide apparatus permitting two central processing units of a data processing system to operate in a peer relationship while controlling the interaction between the central processing units.

It is still another feature of the present invention to permit a central processing unit to be coupled to a data processing system, in which all the central processing units have a peer relationship, even though the central processing unit being coupled uses an operating system and/or signal structures that are not compatible with the operating system 10 and/or signal structures of the data processing system.

The aforementioned and other features are accomplished, according to the present invention, by ensuring that a plurality of central processing unit/operating system combinations, to be coupled in data processing system, have appropriate mechanisms to prevent intentional or unintentional use of resources that have not been assigned to the central processing unit/operating system combination. With the internal mechanisms available to each central processing unit/operating system combination, each central processing unit/operating system combination can operate in a peer relationship, i.e., can have access to all the resources of the data processing system. During initialization procedures, the system resources are allocated to each of the central processing units. During operation of the data processing system, these resources can be dynamically reallocated among the central processing units.

These and other features of the invention will be understood upon reading of the following description along with the drawings.

BRIEF DESCRIPTION OF THE DRAWINGS

FIG. 1A is a block diagram of a bus oriented data processing system having a plurality of central processing units according to the related art, while

FIG. 2A illustrates the apparatus for implementing a peer processor relationship in a multiprocessor data processing system having operating system/central processing unit combinations that are mutually incompatible, while

DESCRIPTION OF THE PREFERRED EMBODIMENT

Detailed Description of the Figures

Figure 2A:
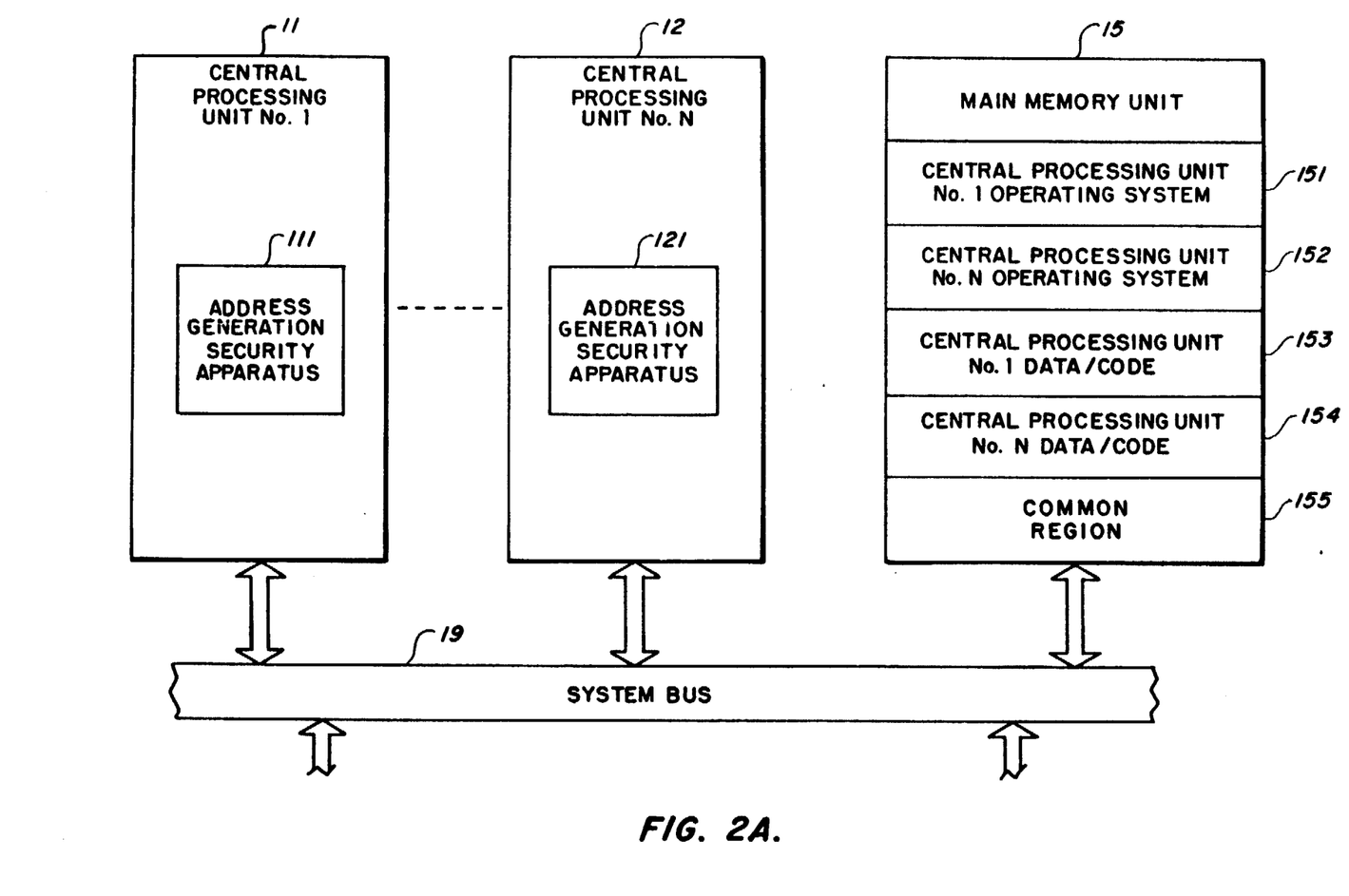

Referring to FIG. 2A, the principal components that permit two operating system/central processing units of a data processing system of multiprocessor data processing system that are generally not compatible to assume a peer relationship are illustrated. Each central processing unit has associated therewith apparatus, software procedures or a combination of apparatus and software programs that prevent the generation of addresses or attempts to access input/output devices are nominally unavailable to the central processing unit. This apparatus is illustrated as address generation security apparatus 111 as part of central processing unit 11 and address generation security apparatus 121 as part of central processing unit 12. The main memory unit 15 is divided into a plurality of regions. Region 151 is a region reserved for the operating system controlling the operation of central processing unit 11, while region 152 is a portion of the main memory unit reserved for the operating system controlling operation of the central processing unit 12. The portion of the main memory unit 15 denoted by region 153 is reserved for the data/code for the central processing unit 11, while the region 154 is reserved for the data/code of central processing unit 12. Region 155 is a common region and accessible to both central processing unit 11 and central processing unit 12.

Figure 2B:
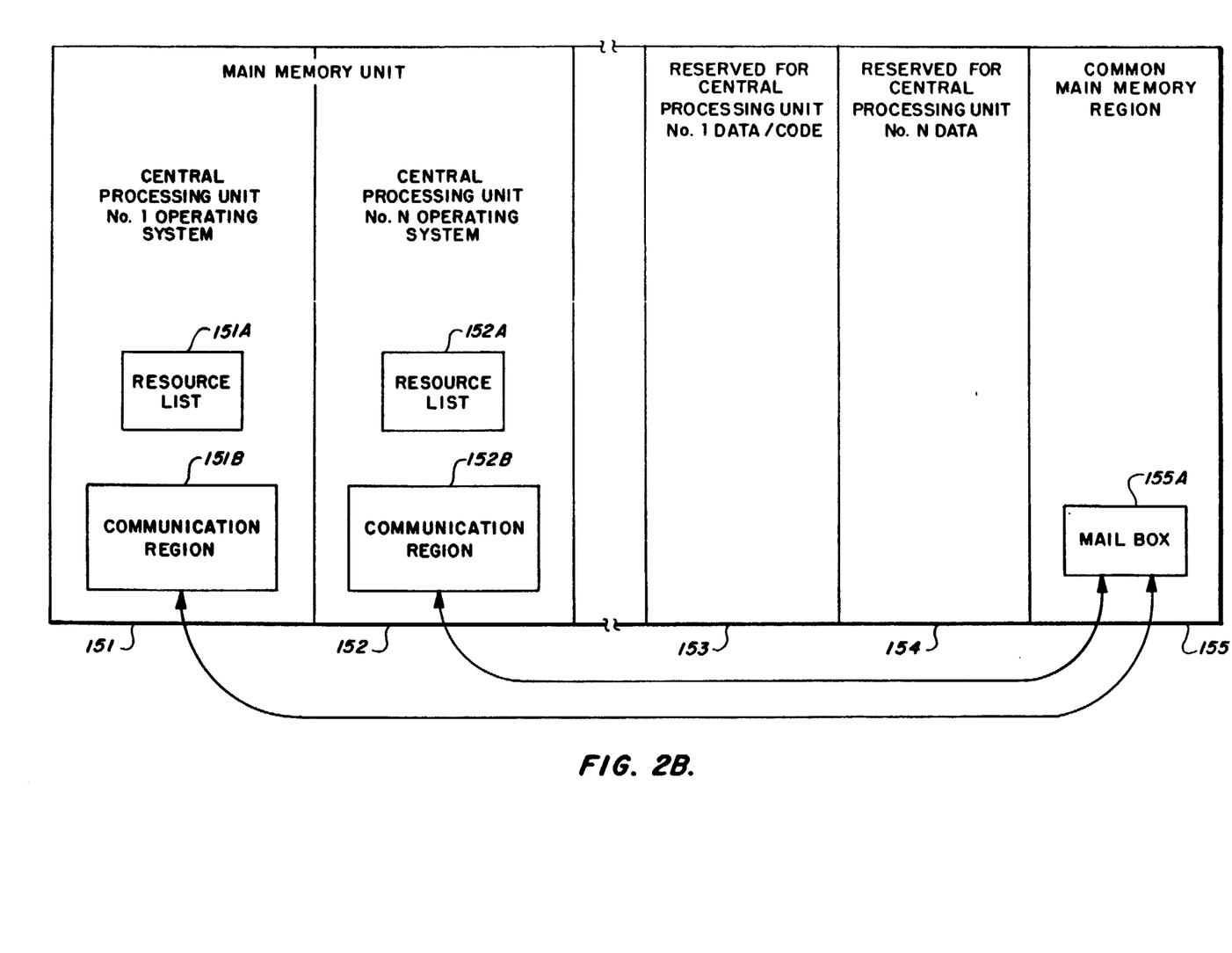
FIG. 2B illustrates the partitioning of main memory storage for two operating system/central processing unit combinations having a peer processor relationship.

Referring to FIG. 2B, more detail in the allocation of the storage of the main memory unit 15 is shown symbolically. The regions 151 and 152 reserved for operating systems of the associated central processing unit each have two subregions (151A and 151B, and 152A and 152B, respectively) important for operation of a peer relationship. The subregions 151A and 152A provide a list of the resources, i.e., input/output devices and reserved main memory regions, reserved for the associated central processing unit. Subregions 151B and 152B provide the procedure by which the two central processing systems can communicate. In the preferred embodiment, this communication is performed through subregion 155A of the portion of main memory unit 15 reserved for usage by both the central processing units 11 and 12 using a technique typically referred to as a data processing system mail box. In this technique, a message is left in the mail box 155A by a first central processing unit and a second central processing unit either reads the contents of the mail box periodically or is alerted by the first central processing unit that a message is available. Upon reading of the contents of the mail box 155A, the second central processing unit can make an appropriate response.

Figure 3:
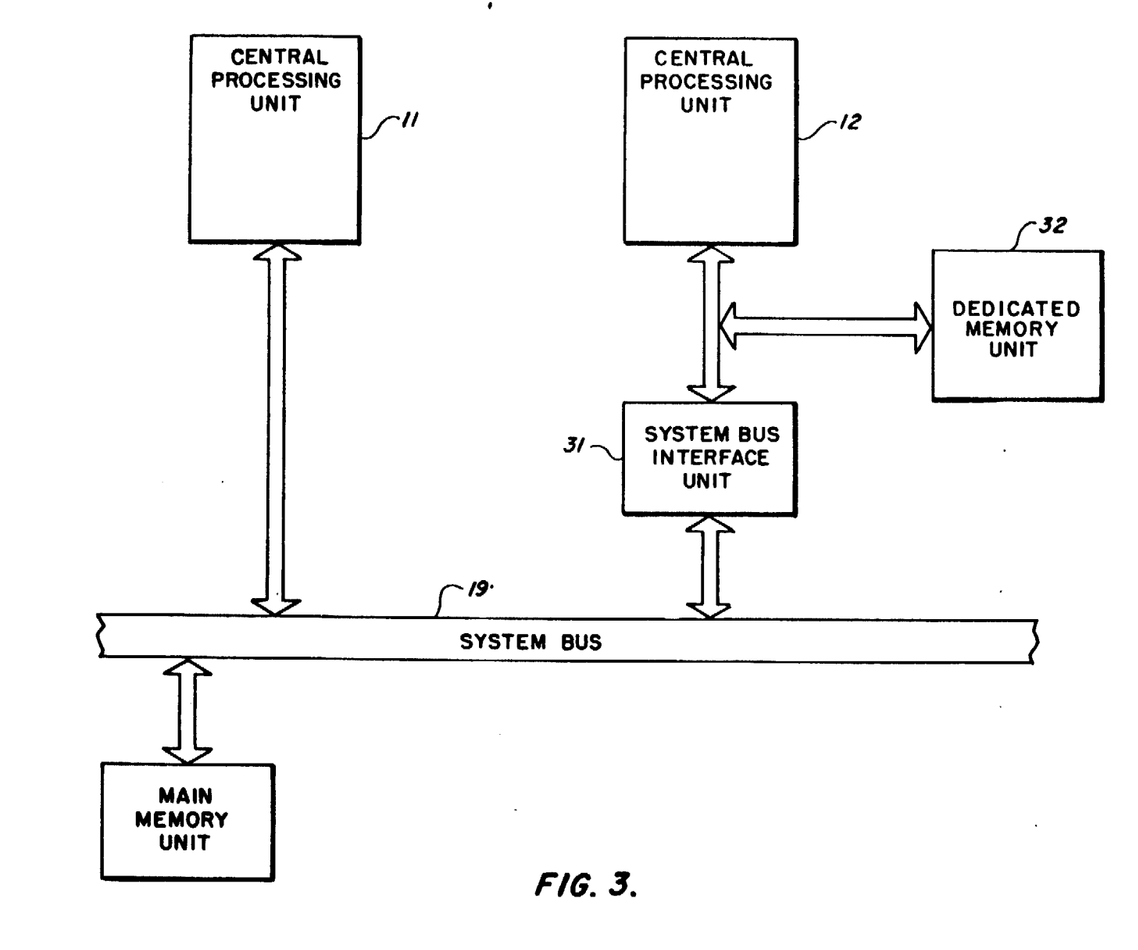
FIG. 3 illustrates additional components that can be required for a multiprocessor data processing system having a peer relationship.

Referring next to FIG. 3, a portion of a data processing system with two central processing units 11 and 12 is shown. Central processing unit 11 is directly coupled to the system bus 19. Central processing unit 12 is coupled to the system bus 19 by system bus interface unit 31. The system bus interface unit 31 and the central processing unit 12 are coupled to dedicated memory unit 32.

Figure 4:
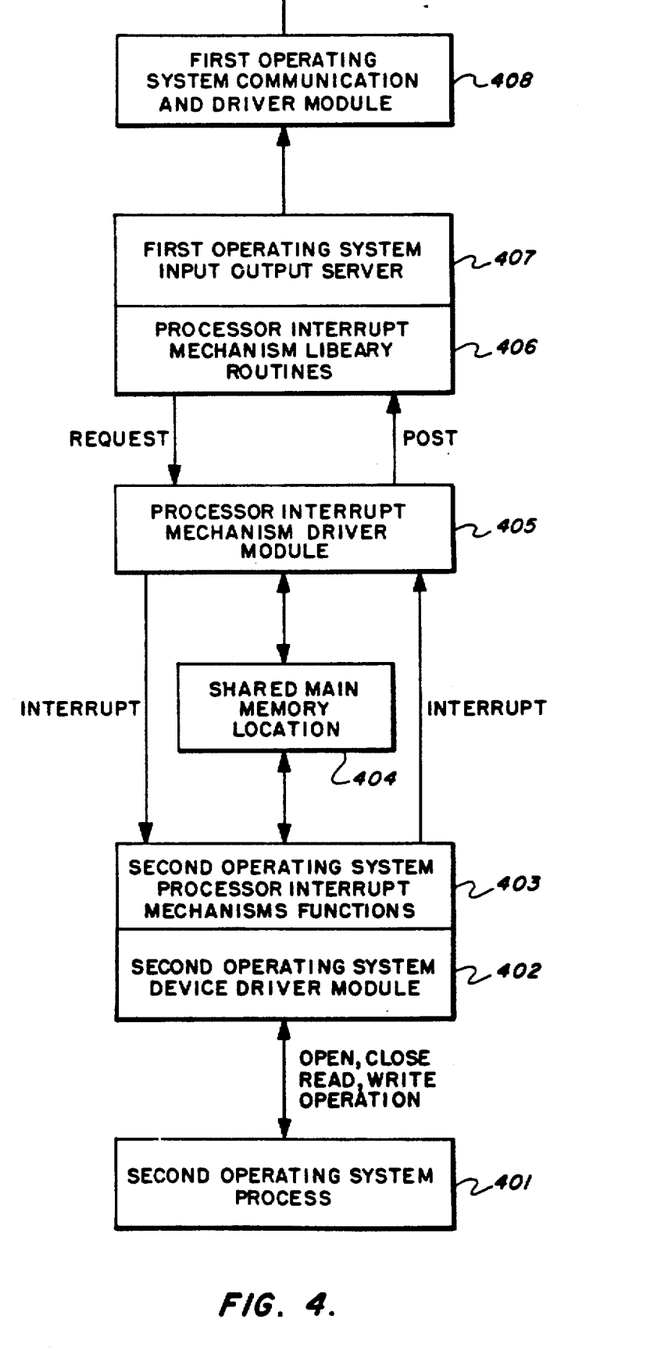
FIG. 4 is a flow diagram illustrating how a user interacting with a data processing system by means of a first operating system can invoke processes requiring a second operating system.

Referring next to FIG. 4, the technique by which a first operating system procedure can be invoked by a second operating procedure is illustrated. In step 401, a second operating system process requires a process that can only be executed by the first processing system, i.e., an input/output operation. The second operating system interacts with the second operating system device driver module 402 as if the second operating system can implement the process. The second operating system driver module, instead of executing the process, applies the driver module to the processor interrupt mechanism driver module 405 by means of the second operating system processor interrupt mechanisms functions 403 and the shared main memory locations 404. Second operating system processor interrupt mechanism 403 and processor mechanism driver module 405 can exchange interrupt signals. The processor interrupt library routines 406 adapts the activity requested by the second operating system and applies the resulting process block to the first operating system input/output server 407. The input/output server 407 applies the appropriate signals to the first operating system communication and driver modules 408 to cause the process originally requested by the second operating system user to be executed.

Operation of the Preferred Embodiment

In an ideal multiprocessor configuration, all of the central processing units would have access to all the resources of the data processing system without the requirement for auxiliary protection mechanisms insuring the partitioning of resources among the central processing units. Moreover, many operating system/central processing unit combinations have the procedures and/or the apparatus which can prevent attempts to access a resource assigned to another central processing unit, but may still be incompatible with a host data processing system. For example, the certain central processing unit activity, such as procedures for accessing selected input/output channels, may not be possible by the central processing unit to be coupled to the data processing unit. Similarly, the central processing unit to be coupled to the data processing system may exchange signal groups with the remainder of the data processing system and can use protocols and formats that are different from the coupled data processing system. Examples of these differences are widths of the system bus signal paths and whether system bus has individual groups of signal paths dedicated to different functions. Finally, conflicts can arise during initialization. For example, different central processing units can expect to find the requisite initialization procedures in overlapping region of the main memory. The present invention discloses the technique and the apparatus which can permit an additional operating system/central processing unit combination to be treated in a peer relationship with respect to the other operating system/central processing unit(s) of a data processing system.

In the preferred embodiment, the host central processing unit 11 is a Honeywell Bull MRX data processing system operating under control of the MOD 400 operating system. The MOD 400 operating system includes procedures that provide for the trustworthiness of the system. In order to provide the data processing system with the capability of executing the wide repertoire of user programs using the UNIX operating system, a central processing unit 12 was selected that operated under control of the UNIX operating system. However, for the implementation of the UNIX operating system available for executing user programs with the selected central processing unit, the requisite protection mechanisms were believed to be inadequate. The patent application entitled "APPARATUS AND METHOD FOR ALTERABLE RESOURCE PARTITIONING ENFORCEMENT IN A DATA PROCESSING SYSTEM HAVING CENTRAL PROCESSING UNITS USING DIFFERENT OPERATING SYSTEMS", cited above, provides apparatus and method for supplying the access protection mechanisms without modification of the data processing system or the central processing unit.

Although the peer processing relationship provides an equality between the central processing units of the data processing system with respect to resources and activity, two situations must be provided for in order to accommodate special circumstances. The first of the special circumstances relates to the protocol used by the system to exchange data signals. Related to the system bus protocol is the organization of main memory. Typically, a "host" central processing unit 11 will be adapted to operate with a system bus and will not require additional manipulation of data groups when transferring the data groups to the system bus. However, the "guest" central processing unit, in general adapted to operate with different system bus protocol, will require a system bus interface unit 31 to permit the transfer of the signal groups between the central processing unit 12 and the system bus. The system bus interface unit 31, to the extent not possible by the central processing unit 12, can develop appropriate control signals and, where necessary, adjust the size of the data groups to be consistent with the remainder of the data processing system.

While the peer processing relationship can be utilized during normal operation during an initialization of the data processing system as described above, one central processing unit must provide the control, such as setting up the resource tables, for all the central processing units. In addition, for the configuration of the preferred embodiment described in the previous paragraph, the guest central processing unit during initialization is programmed to access main memory locations that overlap main memory locations accessed by the host central processing system and attempts to access memory locations that are not available to the main memory system. In order to avoid this potential problem, in the preferred embodiment of the present invention, a dedicated memory unit 32 is coupled to guest central processing unit 12. During initialization of the data processing system, initialization data for the guest central processing unit 12 is entered by a host central processing unit in the dedicated memory unit 32 at locations corresponding to the locations that are accessed by the guest central processing unit during initialization. Thereafter, when the guest central processing unit 12 is initialized, the memory locations in the dedicated memory 34 are addressed by the guest central processing unit and the requisite initialization data transferred to the guest central processing unit 12.

In order to accommodate differences in protocols and formats for signal groups between a host data processing system and a guest central processing unit, a system bus interface unit 31 can be coupled between the host data processing system and the guest central processing units. The system bus interface unit 31 includes the apparatus that converts data, instruction and control signal groups from the data processing system (i.e., the system bus 19 in FIG. 3) into a format compatible with the signal format(s) with which the guest processing unit is designed t operate. The system bus interface unit 31 also has the apparatus to buffer the signal groups against differences in the system clock of the data processing unit and the system clock of the guest central processing unit. Similarly, the system bus interface unit has the apparatus for converting the data, instruction and control signal groups from the guest central processing unit into a format that can be used by and synchronized with the system bus. The conversion and synchronization of the signal groups transferred between the guest central processing unit and the host data processing system can be accomplished by techniques of the related art and are generally implementation specific.

With respect to procedures that are incompatible between the guest central processing unit and the host data processing system, the technique for executing the incompatible procedure is illustrated in FIG. 4. In essence, the execution of the procedure is performed by a central processing unit capable of the procedure execution under the direction of the central processing unit requiring the execution. By providing each central processing unit with the ability to execute incompatible procedures by executing the procedure by a second central processing unit, data processing system resources (e.g., input/output devices), typically inaccessable to certain central processing units, are available to all the central processing units of the data processing system.

Although the invention has been described with reference to two (incompatible) central processing units, it will be clear that the technique described can be used with a multiplicity of central processing units to provide a peer relationship among the central processing units.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processing system in which each central processing unit/operating system combination of said data processing system has access in an peer relationship to all resources of said data processing system, said data processing system comprising:
   a plurality of resources, said plurality of resources including a main memory unit;
   a plurality of central processing unit/operating system combinations, at least one central processing unit/operating system combination being incompatible with other central processing unit/operating system combinations of said data processing system, each of said central processing unit/operating system combinations operating independently, each of said central processing unit/operating system combinations having a storage means associated therewith for storing a list of resources available to said associated central processing unit/operating system combination, each coupled central processing unit/operating system combination coupled to said data processing system having address security mechanisms insuring access only a resources in said list stored in said associated storage means, wherein a central processing unit/operating system combination not having said address security mechanisms has external address security mechanisms coupled thereto prior to being coupled to said data processing system;

transfer means for coupling said plurality of resources and said plurality of central processing unit/operating system combinations in said data processing system, said plurality of central processing unit/operating system combinations being tightly coupled to said main memory unit, each coupled central processing unit/operating system combination coupled to said data processing system having coupling means permitting exchange of data/instruction signal groups with said transfer means, wherein a central processing unit/operating system combination not having said coupling means has an external coupling means coupled between said central processing unit/operating system combination and said transfer means when coupled to said data processing system; and communication means whereby each central processing unit/operating system combination can communicate with every other central processing unit/operations system combination, said communication means for transferring system resources from a list of resources associated with a first central processing unit to a list of resources associated with a second central processing unit.

2. The data processing system of claim 1 wherein said coupling means coupled to a coupled incompatible central processing unit/operating system combination includes an interface means coupled between an incompatible central processing unit/operating system combination and said transfer means for converting data/instruction signal groups incompatible with processing capabilities of said data processing system other than said incompatible central processing unit/operating system combination being transferred from said incompatible central processing unit/operating system combination of data/instruction signal groups capable of being processed by said data processing system other than said incompatible central processing unit/operating system combination, said interface means for converting data/instruction signal groups being transferred from said data processing system other than said incompatible central processing unit/operating system combination to data/instruction signal groups compatible with processing capabilities of said incompatible central processing unit/operating system combination.

3. The data processing system of claim 2 wherein said communication means includes procedure means for providing execution of a procedure by an execution central processing unit/operating system combination in response to signals from a requesting central processing unit/operating system combination.

4. The data processing system of claim 3 wherein said communication means includes initialization means coupled to said incompatible central processing unit/operating system combination for storing initialization code for initializing said incompatible central processing unit/operating system combination.

5. The data processing system of claim 4 wherein said communication means includes mail box means for permitting said first central processing unit/operating system combination to request allocation of a specified system resource to said first central processing unit/operating system combination from any central processing unit/operating system combination of said remainder of said data processing system to which said specified resource is allocated.

6. The data processing system of claim 4 wherein said list of resources in said storage means is allocated during an initialization of said data processing system by a selected central processing unit/operating system combination.

7. The data processing system of claim 5 wherein said incompatible central processing unit/operating system combination and central processing unit/operating system combinations of said remainder of said data processing system communicate through said mail box means, wherein said mail box means is located in said main memory unit.

8. The data processing system of claim 1 wherein said address security mechanisms insuring access to resources in said list of resources include means for verifying that generating addresses for resources by an executing central processing unit/operating system combination are included in said list of resources associated with said executing central processing unit/operating system combination.

9. A method of providing a data processing system having a plurality of tightly coupled central processing unit/operating system combinations, at least one of said central processing unit/operating system combinations being incompatible with said data processing system, wherein each of said plurality of central processing unit/operating system combinations has a peer relationship with others of said plurality of central processing unit/operating system combinations, said peer relationship providing that each central processing unit/operating system combination of a data processing system has equal access to all data processing system resources including a main memory, said method comprising the steps of:

coupling an interface unit between said incompatible central processing unit/operating system combination and a system bus, said interface unit reformatting data/instruction signal groups received from and applied to said system bus thereby permitting exchange of data/instruction signal groups between said incompatible central processing unit/operating system combination and said system bus;

during initialization of said data processing system, generating files of addresses of data processing system resources identifying data processing system resources allocated to each central processing unit/operating system combination;

storing a file of addresses identifying resources allocated to and accessible by said each central processing unit/operating system combination in a storage means associated with said each central processing unit/operating system combination;

insuring that every address generated by said each central processing unit/operating system combination is included in said file of addresses associated with said each central processing unit/operating system combination by adding an address security mechanism to each central processing unit/operating system combination not having an address security mechanism; and providing a communication procedure between said central processing unit/operating system combinations, said communication procedure permitting each central processing unit/operating system combination requiring a selected data processing system resource to cause reallocation of said selected data processing system resource to said file of addresses associated with said central processing unit/operating system combination requiring said selected data processing system resource.

10. The method of claim 9 wherein said coupling step includes the steps of:

for an incompatible central processing unit/operating system combination processing data/instruction signal groups not capable of being processed by at least one other central processing unit/operating system combination, converting data/instruction signal groups transferred for processing to said incompatible central processing unit/operating system combination from said system bus to a format capable of being processed by said incompatible central processing unit/operating system combination by said interface unit; and converting signal groups transferred from said incompatible central processing unit/operating system combination to said system bus into data/instruction signal groups capable of being processed by said at least one central processing unit/operating system combination.

11. The method of claim 9 wherein said providing step includes the steps of:

in a first central processing unit/operating system combination requiring execution of a first procedure, determining that said first central processing unit/operating system combination is not capable of executing said first procedure;

determining by said first data processing system combination that a second central processing unit/operating system combination is capable of executing said first procedure; and using said communication procedure whereby said first central processing unit/operating system combination causes said second central processing unit/operating system combination of said data processing system to execute said first procedure.

12. The method of claim 9 wherein said generating files step includes the step of:

providing at least one of said incompatible central processing unit/operating system combinations with apparatus to initialize said at least one incompatible central processing unit/operating system combination without said at least one incompatible central processing unit/operating system combination accessing a remainder of said data processing system.

13. The method of claim 9 wherein said step of providing a communication procedure includes the step of:

transferring messages between said plurality of central processing unit/operating system combinations by temporary storage of said messages in a commonly accessible portion of said main memory unit, said messages providing for a transfer of an address of a system resource from a file of addresses associated with a first central processing unit/operating system combination to a file of addresses associated with a second central processing unit/operating system combination.

14. The method of claim 9 wherein said generating files step includes the step:

generating said files of addresses identifying resources allocated to said associated central processing unit/operating system combination during an initialization procedure provided by an operating system of at least one central processing unit/operating system combination and provided by a coupled storage means for at least a second data processing unit/operating system combination, wherein said files of addresses are generated by said operating system.

15. The method of claim 14 further comprising the step of:

dynamically reallocating said system resources by inter processor communication by messages transferred between central processing unit/operating system combinations using said communication procedure, said messages being stored temporarily in locations in said main memory commonly accessible to said central processing unit/operating system combinations associated with said reallocating said system resources.

16. A data processing system wherein all central processing unit/operating system combinations have a peer relationship with equal access to all system resources, said data processing system including at least one incompatible central processing unit/operating system combination incompatible with a remainder of said data processing system, said data processing system comprising:

a system bus;

data processing system resources including at least a main memory unit coupled to said system bus;

a plurality of central processing unit/operating system combinations, each coupled central processing unit/operating system combination coupled to said data processing system including an address security mechanism, an address security mechanism being added to a non-secure central processing unit/operating system combination not having an address security mechanism prior to coupling of said non-secure central processing unit/operating system to said data processing system, said plurality of central processing unit/operating system combinations including:

a first central processing unit/operating system combination coupled to said system bus and capable of accessing said data processing system resources, said first central processing unit/operating system combination including a storage means storing a first list of addresses identifying data processing system resources assigned and accessible to said first central processing unit/operating system combination and a first address security mechanism, said first address security mechanism insuring an address generated by said first central processing unit/operating system combination is included in said first list;

an interface unit coupled to said system bus;

a second central processing unit/operating system combination incompatible with said data processing system, said second central processing unit/operating system combination being coupled to said interface unit, said interface unit converting data/instruction signal groups from said system bus to a format compatible with said second central processing unit/operating system combination and converting data/instruction groups from said second central processing unit/operating system to a format compatible with said data processing system, said second central processing unit/operating system combination including a second storage means storing a second list of addresses identifying data processing system resources assigned and accessible to said second central processing unit/operating system combination and a second address security mechanism, said second address security mechanism insuring that an address generated by said second central processing unit/operating system combination is included in said second list; and communication means for transferring an address from said first list to said second list in response to a request procedure from said second central processing unit/operating system combination.

17. The data processing system of claim 16 further comprising:

procedure means for providing a selected central processing unit/operating system combination with results derived from a required procedure, wherein said required procedure is incompatible with said selected central processing unit/operating system combination, said selected central processing unit/operating system combination causing a different central processing unit/operating system combination compatible with said required procedure to execute said required procedure and provide said results to said selected central processing unit/operating system combination.

18. The data processing system of claim 17 wherein said main memory unit includes common locations accessible to said different central processing unit/operating system combination and to said selected central processing unit/operating system combination, wherein communication between said different central processing unit/operating system combination and said selected central processing unit/operating system combination is implemented by storage and retrieval of signal groups in said main memory unit common locations.

19. The data processing system of claim 16 wherein said second central processing unit/operating system combination includes initialization means for initializing said second central processing unit/operating system combination without interaction with said data processing system resources.

20. The data processing system of claim 16 wherein said communication means includes:

a first communication portion associated with said first central processing unit/operating system combination;

a second communication portion associated with said second central processing unit/operating system combination: and locations in said main memory unit accessible to said first central processing unit/operating system combination and said second central processing unit/operating system combination for transferring messages relating to requests for resources between said first and said second central processing unit/operating system combinations.

* * * * *